UNITED STATES PATENT OFFICE.

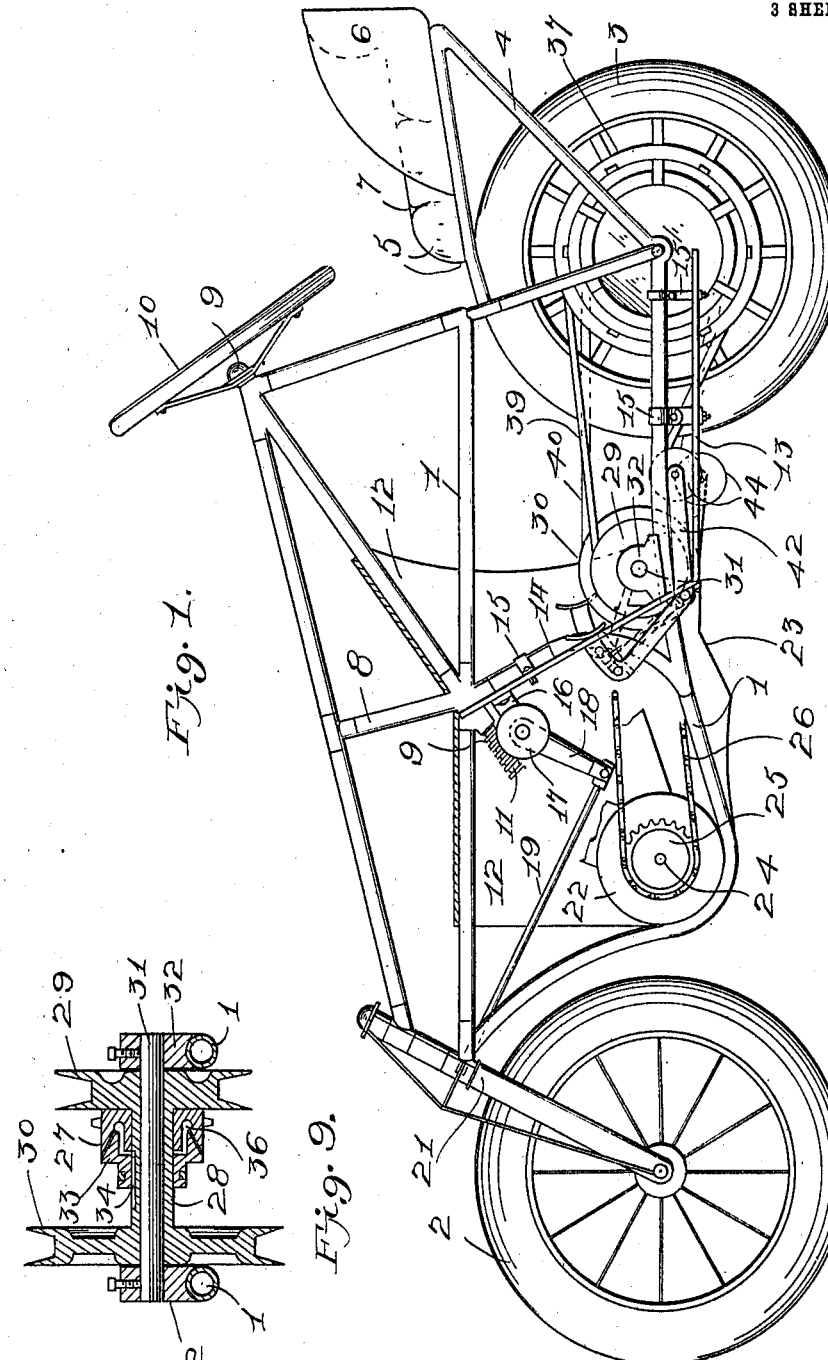

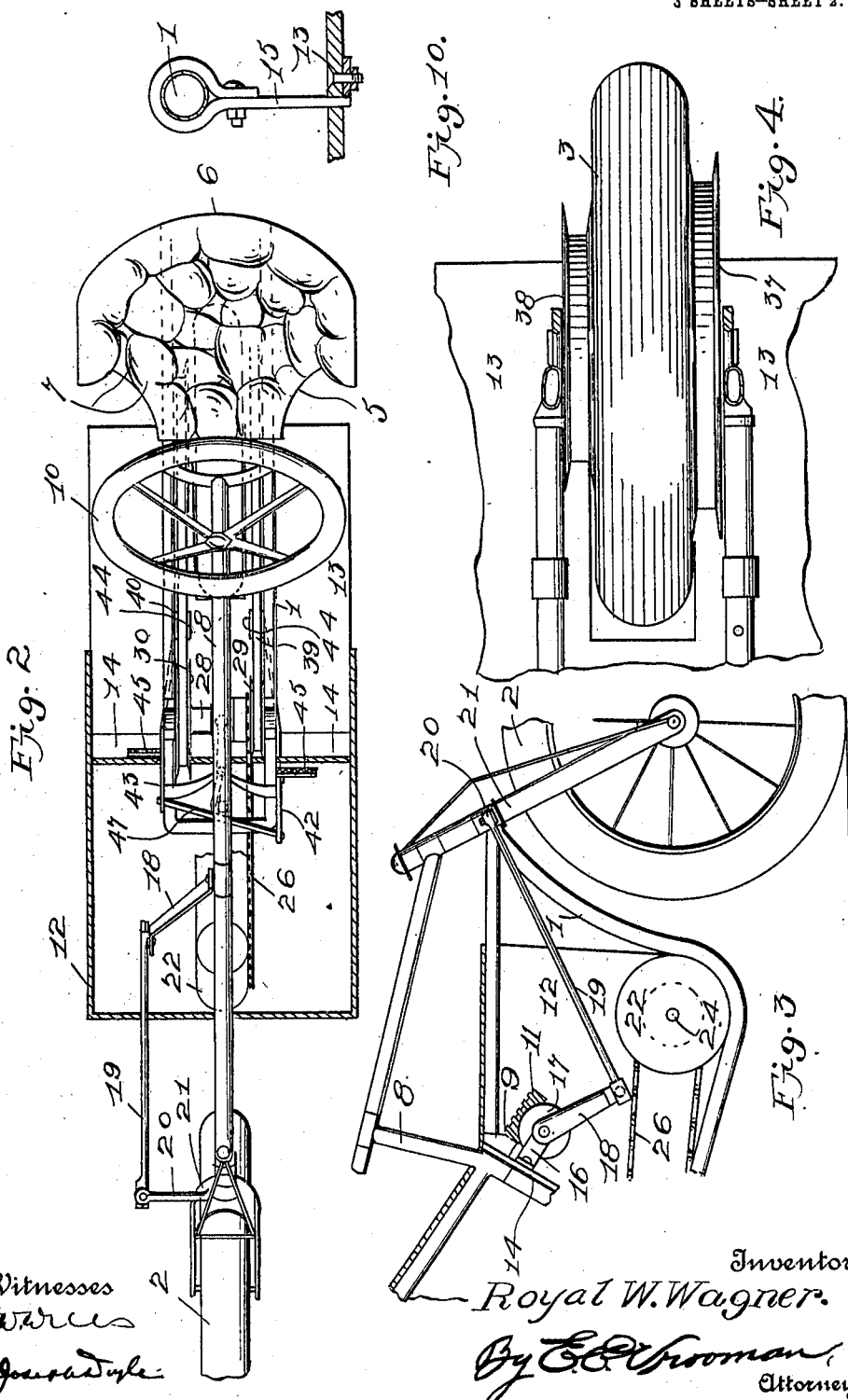

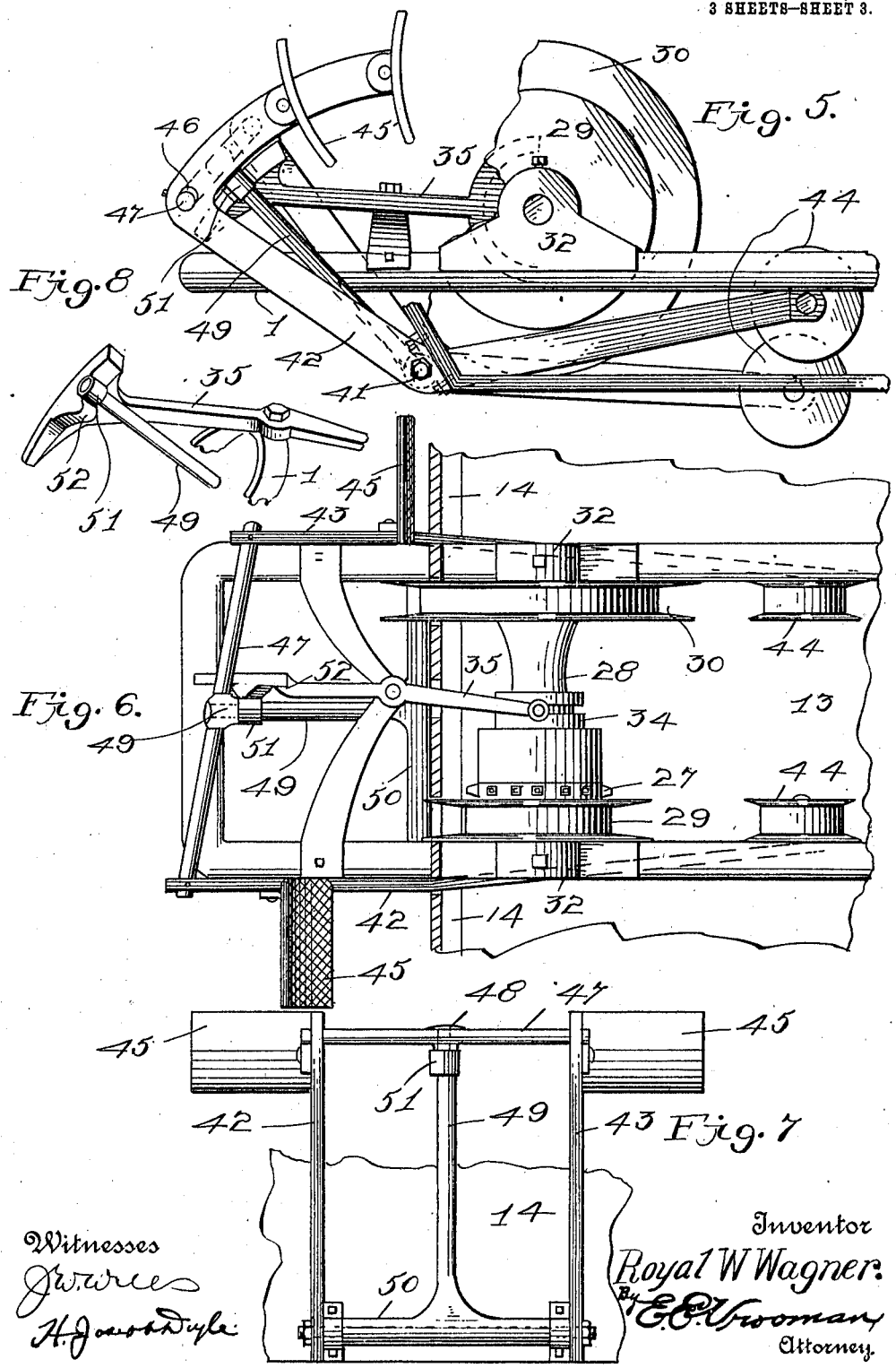

ROYAL W. WAGNER, OF SPIRIT LAKE, IOWA.

VEHICLE.

982,451. Specification of Letters Patent. Patented Jan. 24, 1911.

Application filed November 11, 1909. Serial No. 527,517.

*To all whom it may concern:*

Be it known that I, ROYAL W. WAGNER, a citizen of the United States of America, residing at Spirit Lake, in the county of Dickinson and State of Iowa, have invented certain new and useful Improvements in Vehicles, of which the following is a specification, reference being had therein to the accompanying drawing.

This invention relates to motor cycles, and the principal object of the same is to provide means whereby the same convenience in so far as comfortable seating arrangements, steering, and motor control may be had as in automobiles.

In carrying out the object of the invention generally stated above it is contemplated providing a suitable frame which is equipped with a hood for the motor, a foot board, a comfortable seat for the driver within reach of which a steering wheel is arranged for controlling the front fork of the vehicle, means being provided whereby the entire control of the motor and driving mechanism may be operated by the driver's feet.

In the practical application of the invention as stated above, it will be understood, of course, that the essential features thereof are necessarily susceptible of changes in details and structural arrangements, one preferred and practical embodiment of which is shown in the accompanying drawings, wherein:—

Figure 1 is a view in side elevation of the improved motor cycle, the hood thereof being broken away to expose the motor and steering gear. Fig. 2 is a top plan view, the hood being broken away. Fig. 3 is a fragmentary view in side elevation viewed on the opposite side to that shown in Fig. 1. Fig. 4 is a fragmentary top plan view of the rear wheel of the motor cycle. Fig. 5 is an enlarged, fragmentary side elevation of the treadles and mechanism controlled thereby. Fig. 6 is a top plan view thereof. Fig. 7 is a front view of the treadles and the shifting levers shown in Figs. 5 and 6. Fig. 8 is a detail perspective view of the clutch operating levers. Fig. 9 is a vertical sectional view of the speed pulleys, drive sprocket, and the clutch therefor. Fig. 10 is a detail elevation of one of the hangers for supporting the foot board.

Referring to said drawings by numerals, 1 designates the main frame in which the usual front wheel 2 and rear wheel 3 are mounted. A rearwardly projecting supplemental frame 4 straddles the rear wheel 3 and supports an operator's seat 5 which is provided with a raised back 6 and suitably cushioned, as indicated at 7. Another supplemental frame 8 projects from the upper part of the main frame 1, said frame 8 terminating adjacent the operator's seat 5 and having a steering shaft 9 extending obliquely therethrough, one end of said shaft 9 being equipped with a hand wheel 10 that is arranged so that it may be readily operated by the occupant of the seat 5. The other end of said shaft 9 extends into the main frame 1 and is provided with a worm 11.

A hood 12 is carried by the main frame 1 and incloses the driving mechanism of the cycle, said hood being open at its rear end and provided with a rearwardly projecting foot board 13, the front end of which projects upward on a forward incline to provide a dashboard 14. The foot board 13 and dashboard 14 are connected to the main frame 1 by means of the hanger clips 15, a detail view of one of which is shown in Fig. 10 of the drawings.

On the outer surface of the dashboard, and preferably adjacent the top thereof, a bearing 16 is provided which supports a pinion 17 that is in mesh with the worm 11 of shaft 9. Said pinion 17 has one end of a crank arm 18 fast thereon, the other end of said crank arm being pivotally connected to one end of a connecting rod 19, which in turn is pivotally connected to the outer end of a crank arm 20 projecting from the fork 21 of the front wheel 2, so that by manipulating the hand wheel 10 the said front wheel may be readily operated to steer the cycle, as will be understood.

The motor 22 is suitably supported within the lower front portion of the main frame 1 so that it will be cooled by the air entering the front end of the hood 12 and leaving by the outlet 23 beneath the dashboard 14. The shaft 24 of the motor 22 is equipped with a sprocket 25 which has a chain connection 26 with a sprocket 27 loosely mounted on the sleeve 28 which is provided with integral end pulleys 29—30, said pulleys being of different diameter. Said sleeve is loosely mounted on a fixed shaft 31 transversely mounted in lugs 32 carried by the base of the main frame 1. A clutch member 33 has a key connection 34 with the sleeve 28 which permits said member to be moved longitudinally of the sleeve but cannot rotate independently thereof. Said member 33 has a pivotally mounted shifting lever 35 projecting therefrom, which is adapted to cause the same to be thrown into locking engagement with the clutch recess 36 formed in the body of the sprocket 27 to cause said sprocket and sleeve and its pulleys to rotate in unison.

The rear wheel 3 is equipped with two pulleys 37—38, one being arranged on each side thereof and supported by the rim. A pair of loose belts 39—40 are employed, the belt 39 connecting pulleys 29—37, and the belt 40 connecting pulleys 30 and 38.

A rocker shaft 41 extends transversely across the lower portion of the main frame 1 below the shaft 31, said shaft 41 having end arms 42—43 pivotally mounted thereon. Said arms 42—43 have their rear end projecting below the belts 39—40 and are equipped with an idle pulley 44 that is at all times in contact with the underside of said belts. The forward end of said arms is bent at an angle and on an upward incline and terminates in a transversely arranged preferably concaved treadle 45. Adjacent their treadle, each arm 42—43 is provided with a guide slot 46, said guide slots serving as end supports for a transverse bar or rod 47 the central portion of which has a universal connection 48 with the outer end of a brace rod 49 projecting from and integral with a sleeve 50 mounted on the rocker shaft 41. The rod 49, adjacent its connection with the transverse bar 47 is equipped with a roller 51 adapted to contact with a cam surface 52 formed on the clutch shifting lever 35 when the rod 47 is rocked so that said shifting lever will be rocked thereby to operate the clutch member 33.

It will be seen from the foregoing that the present invention provides an inclosing hood for the engine or motor which not only thoroughly protects the same but also provides means which assure a constant circulation of cooling air about the motor, and also that through the arrangement of the operator's seat and the steering wheel over the rear wheel, a comfortable position is afforded the operator while operating the motor cycle. Another prominent and distinctive feature of the invention is in the foot controlled mechanism for regulating the speed of the cycle. It will be apparent that by rocking either of the treadles outwardly, the end roller 51 of rod 49 will contact with the cam surface 52 of clutch shifter 35, and cause the same to slide clutch member 33 into binding engagement with the sprocket 27 thereby locking said sprocket to sleeve 28.

As is stated in the foregoing, the pulleys 29—30 are of different diameters, the pulley 30 being the high speed and the pulley 29 being the low speed, and both pulleys are connected to the rear wheel pulleys by the loose belts 39—40. As is shown in Fig. 1, the low speed pulley 29 is in gear with the pulley 37 of the rear wheel, it being so placed by pushing the left treadle outward to cause its arm 42 to raise the end roller 44 and thereby tighten the belt which connects said pulleys. A similar movement of the opposite treadle will throw the high speed pulleys into gear.

The cam surface 52 of shifting lever 35 projects outward at its center so that when rod 49 is rocked by the pedals 45, roller 51 will contact with said center and force the shifting lever away from rod 49, thereby throwing clutch 33 into engagement with sprocket 27. In the normal running position of the cycle, roller 51 and the outwardly projecting center of the cam surface 52 are in engagement, thereby retaining clutch 33 and sprocket 27 engaged. And when roller 51 is above or below said central portion of cam surface 52, the pressure against the shifting lever 35 is removed, thereby freeing the clutch 33 from the sprocket 27 so that said sprocket will run idle.

To brake the cycle, it will be seen that by rocking both treadles outward the roller 51 will be carried, beyond the central portion of the cam, thereby releasing the clutch 33 which cuts off the power from the pulleys 29—30 and simultaneously tightens the loose belts 39—40 and cause the same to bind upon the rear wheel pulleys.

What I claim as my invention is:—

1. A machine of the character described comprising a main frame, a steering wheel and a driving wheel therefor, a motor carried by said frame, a pair of pulleys carried by said driving wheel, a fixed shaft mounted in said frame, a sleeve loose on said shaft, pulleys carried by said sleeve, a sprocket loose on said sleeve and operated by said motor, a loose belt connection between the pulleys of the driving wheel and the pulleys of the said sleeve, and treadle mechanism for clutching said sprocket to said sleeve and also tightening said belt connection.

2. In a motor cycle, the combination with the frame and the motor mounted therein, of a driving wheel provided with oppositely disposed pulleys, a low speed and a high speed pulley carried by said frame, a loose belt connection between the high speed pulley and the low speed pulley and the pulleys of the driving wheel, means operated by said motor for rotating said pulleys, and treadle mechanism for selectively tightening the belt of the low or high speed pulley.

3. In a motor cycle, the combination with the frame and the motor thereof, of a drive wheel in said frame provided with pulleys, pulleys loosely mounted in said frame, a loose belt connection between the pulleys of the driving wheel and the pulleys of the frame, means connected to said motor for operating said frame pulleys, and treadle mechanism for tightening said loose belt connection.

4. A motor cycle comprising a frame, a steering wheel and a driving wheel therefor, a motor mounted in said frame, a pair of integrally connected spaced apart pulleys loosely mounted in said frame, said pulleys being of different diameter, a sprocket connection between said pulleys and motor, pulleys carried by said driving wheel, loose belts connecting the pulleys of the frame with the pulleys of the driving wheel, and treadle mechanism for controlling the sprocket connection between the motor and the frame pulleys and also for selectively tightening said belts.

5. A motor comprising a frame, steering and driving wheels therefor, a motor mounted in said frame, a fixed shaft also mounted in said frame, a sleeve loose thereon, a high speed and a low speed pulley carried by said sleeve, a sprocket wheel loose on said sleeve, a chain connection between said sprocket and said motor, a clutch slidable on said sleeve, a shifting lever for operating said clutch to cause the same to lock the sprocket to the sleeve, a pair of pulleys on said driving wheel, a loose belt connection between the pulleys of the frame and the pulleys of the driving wheel, and treadle mechanism for operating said shifting lever and also selectively tightening said belt connection.

6. A motor cycle comprising a frame, a driving wheel therefor, a motor mounted in said frame, high and low speed pulleys loosely mounted in said frame, a loose belt connection between said pulleys and said driving wheel, a sprocket connection between said pulleys and said motor, a pair of rocker arms pivotally mounted in said frame and carrying a treadle at one end and a belt tightening pulley at the other end, and means operated by said rocker arms for controlling said sprocket connection.

7. A motor cycle comprising a frame, a driving wheel therefor, oppositely disposed side pulleys carried by said wheel, a motor in said frame, a high and a low speed pulley loosely mounted in said frame, a motor for operating said high and low speed pulleys, a pair of loose belts connecting the high and low speed pulleys with the pulleys of the driving wheel, and rocker arms pivotally mounted in said frame and adapted to selectively tighten either of said belts.

8. A motor cycle comprising a frame, a driving wheel therefor, pulleys mounted on said wheel, a high and a low speed pulley loosely mounted in said frame, a pair of loose belts connecting said high and low speed pulleys with the pulleys of said driving wheel, a motor mounted in said frame, a sprocket connection between said speed pulleys and said motor, a rocker shaft extending across said frame, end arms mounted thereon, and a treadle carried by one end of said arms whereby the same may be manually operated to selectively tighten said belts.

In testimony whereof I hereunto affix my signature in presence of two witnesses.

ROYAL W. WAGNER.

Witnesses:
L. SPERBECK,
C. H. SPERBECK.